United States Patent
Stewart et al.

(10) Patent No.: US 12,514,746 B2
(45) Date of Patent: Jan. 6, 2026

(54) SYSTEM AND METHOD FOR HEATING AND COOLING A THERMAL ACCESSORY

(71) Applicant: CardioQuip, LLC, College Station, TX (US)

(72) Inventors: William Stewart, College Station, TX (US); John Dean, College Station, TX (US); Daniel Coronel, College Station, TX (US); Valerie Cote, College Station, TX (US)

(73) Assignee: CardioQuip, LLC, College Station, TX (US)

( * ) Notice: Subject to any disclaimer, the term of this patent is extended or adjusted under 35 U.S.C. 154(b) by 475 days.

(21) Appl. No.: 17/954,271

(22) Filed: Sep. 27, 2022

(65) Prior Publication Data

US 2023/0118773 A1      Apr. 20, 2023

Related U.S. Application Data

(60) Provisional application No. 63/257,001, filed on Oct. 18, 2021.

(51) Int. Cl.
*A61F 7/00* (2006.01)
*G05D 23/19* (2006.01)

(52) U.S. Cl.
CPC .......... *A61F 7/0085* (2013.01); *A61F 7/0097* (2013.01); *G05D 23/1902* (2013.01);
(Continued)

(58) Field of Classification Search
CPC ...... A61F 2007/0054; A61F 2007/0075; A61F 2007/0076; A61F 2007/0086;
(Continued)

(56) References Cited

U.S. PATENT DOCUMENTS 8,449,589 B1    5/2013  Harsy
2003/0078638 A1* 4/2003  Voorhees .............. A61F 7/0085
                                                   607/104
(Continued)

FOREIGN PATENT DOCUMENTS

WO    2023069237 A1    4/2023

OTHER PUBLICATIONS

International Search Report and Written Opinion from International Application No. PCT/2022/045018 mailed Jan. 9, 2023, 10 pages.

*Primary Examiner* — Tigist S Demie
(74) *Attorney, Agent, or Firm* — Perkins Coie LLP

(57) ABSTRACT

A thermal accessory controller comprising an input conduit providing a liquid path for a thermal liquid from the thermal accessory controller to a thermal accessory, an output conduit providing a liquid path for the thermal liquid from the thermal accessory to the thermal accessory controller, a first liquid pump in liquid communication with the input conduit and the output conduit, and a thermal liquid reservoir in liquid communication with the first liquid pump. The thermal accessory controller includes a first liquid block in liquid communication with the first liquid pump, the first liquid block including an internal channel for transferring the thermal liquid, and a second liquid block including an internal channel for transferring a coolant liquid. The thermal accessory controller includes a heating component in liquid communication with the first liquid pump, a cooling component in liquid communication with the second liquid block, and a heat transfer component configured to transfer heat from the first liquid block to the second liquid block.

20 Claims, 8 Drawing Sheets

(52) U.S. Cl.
CPC .. *G05D 23/1917* (2013.01); *A61F 2007/0054* (2013.01); *A61F 2007/0086* (2013.01); *A61F 2007/0093* (2013.01); *A61F 2007/0096* (2013.01)

(58) Field of Classification Search
CPC ...... A61F 2007/0093; A61F 2007/0096; A61F 7/0085; A61F 7/0097; A61F 7/02
See application file for complete search history.

(56) References Cited

U.S. PATENT DOCUMENTS

| | | | |
|---|---|---|---|
| 2009/0076574 A1* | 3/2009 | Noel | B32B 3/28 607/109 |
| 2012/0227432 A1 | 9/2012 | Creech et al. | |
| 2016/0242957 A1* | 8/2016 | Schaefer | A61F 7/007 |
| 2018/0185189 A1* | 7/2018 | Weber | A61F 7/0085 |
| 2018/0369015 A1 | 12/2018 | Glucksman et al. | |
| 2019/0336331 A1* | 11/2019 | Basinger | A61F 7/007 |
| 2021/0060230 A1 | 3/2021 | Hopper et al. | |

* cited by examiner

SYSTEM AND METHOD FOR HEATING AND COOLING A THERMAL ACCESSORY

CROSS-REFERENCE TO RELATED APPLICATION(S) AND CLAIM OF PRIORITY

The present application is related to U.S. Provisional Patent No. 63/257,001, filed 18 Oct. 2021, entitled "THERMAL BLANKET SYSTEM USING PROPYLENE GLYCOL". Provisional Patent No. 63/257,001 is assigned to the assignee of the present application and is hereby incorporated by reference into the present application as if fully set forth herein. The present application hereby claims priority under 35 U.S.C. § 119(e) to U.S. Provisional Patent No. 63/257,001.

TECHNICAL FIELD

The present application relates generally to patient temperature management systems used for cooling and heating blood, bodily tissues, or liquids in an extracorporeal perfusion system using thermal accessories such as liquid-circulating medical pads, blankets, and heat exchangers.

BACKGROUND

Patient temperature management devices are used in a variety of medical applications, including emergency medical services, extracorporeal membrane oxygenation, intensive care unit (ICU) treatment, cardiovascular perfusion, and targeted temperature management, among others. Following a cardiac arrest, for instance, a patient may be cooled below normothermic temperatures (e.g., 37° C.) to slow metabolic activity and reduce the risk of neurological injury. During cardiovascular surgery, a patient may be cooled to lower temperatures to reduce metabolic activity, followed by a controlled rewarming to normothermic temperatures. Conversely, a patient body or body part may be warmed above normothermic temperatures for other therapeutic purposes.

Patient temperature management devices include recirculating air currents or liquid paths that control the temperature of a thermal accessory, such as heat exchangers, extracorporeal oxygenators, thermal blankets, and thermal wraps. These accessories may be used alone or in conjunction with other perfusion apparatuses (e.g., heart-lung machines) to control the temperature of a patient or the temperature of liquids administered to a patient. For example, a heart-lung machine circulates blood through one channel of a heat exchanger while a heater-cooler circulates temperature-controlled liquid through a separate channel. This allows energy transfer between the liquids without direct contact. In another example, a blanket warmer circulates temperature-controlled liquid through a thermal pad to modulate the temperature of a patient supracutaneously.

Conventional liquid-circulating patient temperature management systems utilize various heating and cooling elements with complex software systems to stabilize the temperature of the circulating liquid. Due to differences in thermal transfer, liquid-circulating temperature management devices maintain temperature equilibrium within ±0.5° C. of the target temperature, while air-circulating devices typically exhibit less control of temperature. The enhanced stability of liquid-based devices is required for new clinical applications of long-term patient temperature management devices such as extracorporeal membrane oxygenation (ECMO) and targeted temperature management (TTM).

Patient temperature management systems, thermal blankets and other types of thermal accessories may become contaminated with bacteria, posing a contamination risk in an operating room and possibly causing patient infection. The contamination risk emanates from the use of liquid as the temperature regulating medium in the temperature control devices. Although operator manuals may recommend the use of filtered liquid or sterile liquid, customers often ignore these indications, which leads to the contamination of the equipment. Bacteria inside temperature control devices may form biofilms on the walls of components. Once a biofilm is formed, cleaning and disinfecting procedures that utilize detergents and disinfecting agents are often ineffective at completely removing the biofilm, leading to the regrowth of bacteria in the liquid path.

There is a need for improved systems and methods for performing patient temperature management in an extracorporeal perfusion system, targeted temperature management, or other patient temperature management applications.

SUMMARY

To address the above-discussed deficiencies of the prior art, it is a primary object of the present disclosure to provide a thermal accessory controller comprising an input conduit configured to provide a liquid path for a thermal liquid from the thermal accessory controller to a thermal accessory, an output conduit configured to provide a liquid path for the thermal liquid from the thermal accessory to the thermal accessory controller, a first liquid pump in liquid communication with the input conduit and the output conduit, and a thermal liquid reservoir in liquid communication with the first liquid pump. The thermal accessory controller further includes a first liquid block in liquid communication with the first liquid pump, the first liquid block including an internal channel for transferring the thermal liquid, and a second liquid block including an internal channel for transferring a coolant liquid. The thermal accessory controller also includes a heating component in liquid communication with the first liquid pump, a cooling component in liquid communication with the second liquid block, and a heat transfer component configured to transfer heat from the first liquid block to the second liquid block.

It is another object of the present disclosure to provide a method of operating a thermal accessory controller including pumping a thermal liquid from a liquid reservoir through a heating component and a first liquid block, the first liquid block including an internal channel for transferring the thermal liquid, and pumping the thermal liquid from the first liquid block through a thermal accessory coupled to the thermal accessory controller. The method also includes pumping the thermal liquid from the thermal accessory through the liquid reservoir, heating in a heating mode the thermal liquid in the heating component and transferring heat in a cooling mode from the first liquid block to a second liquid block, the second liquid block including an internal channel for transferring a coolant liquid.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged thermal regulation system.

The present disclosure describes a system that provides patient temperature management in a variety of medical applications, such as emergency medical services (EMS), extracorporeal membrane oxygenation (ECMO), and intensive care unit (ICU) treatment, among others. The disclosed system achieves temperature regulation by means of conductive heat transfer of a liquid using heaters, coolers, pumps, and circulatory tubing. The disclosed system supplies a temperature-controlled thermal liquid to an attached patient accessory to regulate patient temperature. Exemplary patient accessories may include a blanket that covers a patient, a pad on which a patient lies, a garment (e.g., a wrap) that the patient wears, a heat exchanger, and the like.

Figure 1:
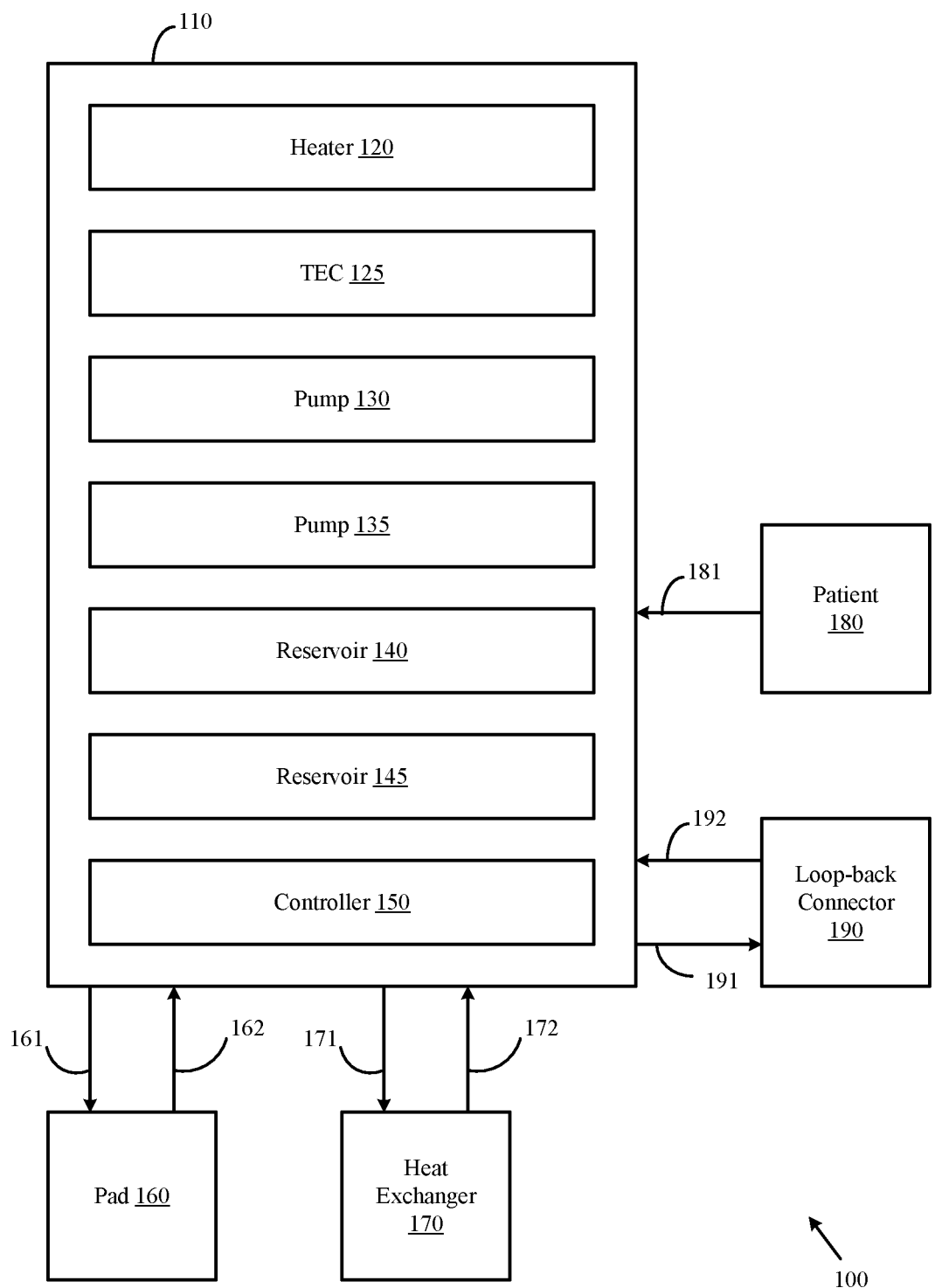
FIG. 1 is a block diagram illustrating the components comprising a thermal regulation system according to one embodiment of the disclosure.

FIG. 1 shows a block diagram of a thermal regulation system 100 and accessories according to one embodiment of the disclosure. Note that FIG. 1 depicts features that are described as functional units. This grouping has been done to discern between operations of the system and should not be taken as an implication that the units must be distinct or separate hardware components. The thermal regulation system 100 comprises a thermal accessory controller (TAC) 110, which includes a heater 120, a thermoelectric cooler (TEC) block 125, liquid pumps 130 and 135, liquid reservoirs 140 and 145, and a controller 150.

The thermal regulation system 100 also includes attachable accessories such as a pad 160, a heat exchanger 170, and a loop back connector 190. The pad (or alternate accessory) 160, the heat exchanger 170, and loop back connector 190 are connected to the thermal accessory controller 110 by means of input liquid conduits (e.g., hoses) 161, 171, and 191, respectively, and output liquid conduits 162, 172, and 192, respectively. The temperature data 181 from a patient 180 is input into the thermal accessory controller 110. More detail of the arrangement of liquid connections within and between the components is described below with reference to FIGS. 2-7.

Figure 2:
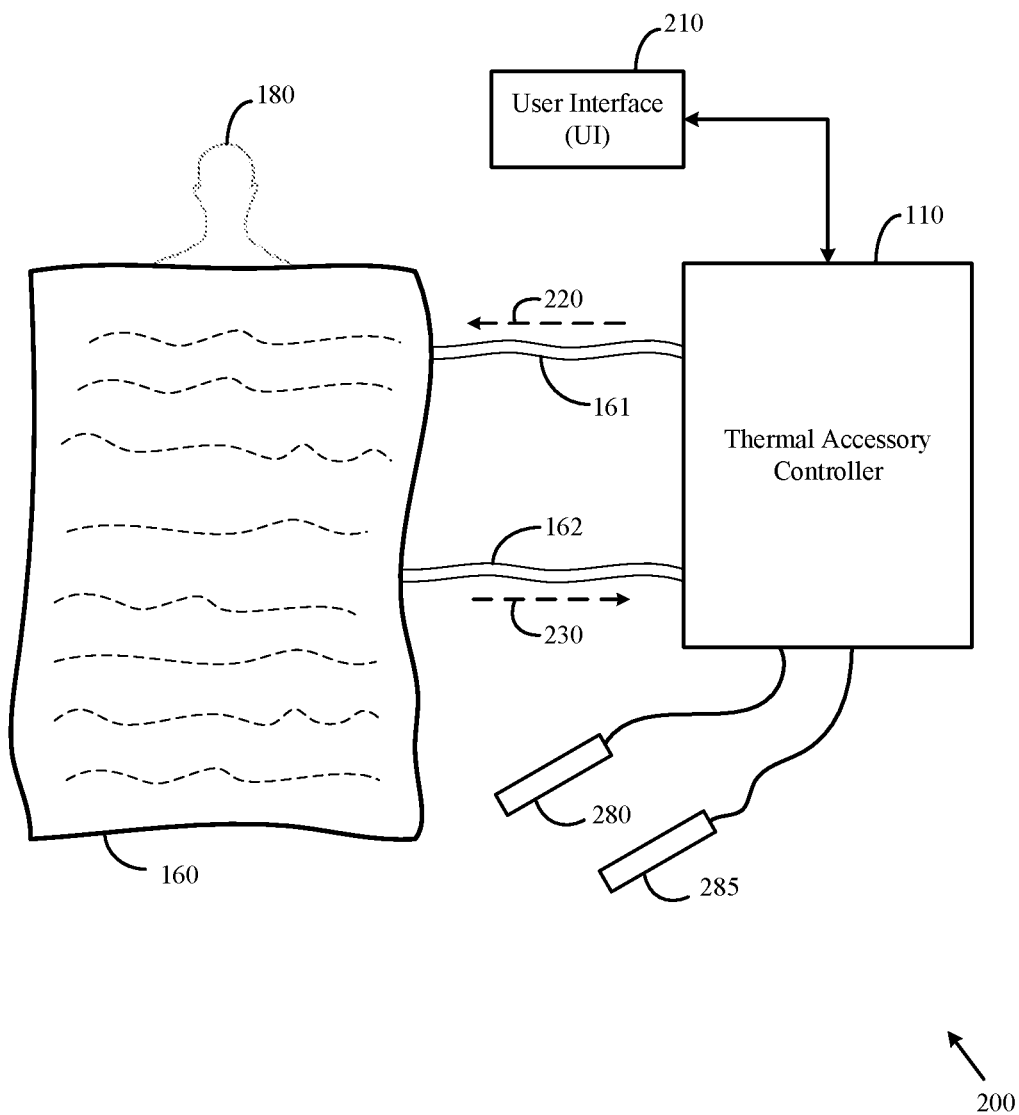
FIG. 2 illustrates a patient thermal regulation system in a representative application according to one embodiment of the disclosure.

FIG. 2 illustrates a patient thermal regulation system 200 according to one embodiment of the disclosure. The patient thermal regulation system 200 comprises a thermal accessory controller 110, a user interface 210, a patient accessory 160, an output conduit 162, an input conduit 161, and electronic temperature probes 280 and 285. The user interface 210 allows a user or operator to control the operation of the thermal accessory controller 110. In an advantageous embodiment, the user interface 210 may be a laptop computer, a mobile phone, a tablet device, a human-machine interface integrated into or in communication with TAC 110, or another medical device that communicates by wireline or wirelessly with the thermal accessory controller 110.

In an example embodiment, temperature probe 280 and temperature probe 285 may be an oral thermometer, a rectal thermometer, an esophageal thermometer, a skin thermometer, or the like. The thermal accessory controller 110 reads temperature recordings from temperature probes 280 and 285 and, in response, may increase (heat) or decrease (cool) the temperature of a thermal liquid that circulates through the patient accessory 160. In a heating mode, the warmed thermal liquid provides thermal energy to the patient by contacting the patient accessory 160, and the patient accessory 160 contacting the patient 180. In a cooling mode, the cooled thermal liquid absorbs thermal energy from the patient 180 through the patient accessory 160.

As indicated by the dotted directional liquid-flow arrow 220, the input conduit 161 (e.g., a hose 161) carries temperature-controlled thermal liquid from the thermal accessory controller 110 to the patient accessory 160. As indicated by the dotted directional liquid-flow arrow 230, the output conduit 162 (e.g., a hose 162) returns the temperature-controlled thermal liquid from the patient accessory 160 back to the thermal accessory controller 110. The returned thermal liquid may then be rewarmed or cooled as needed.

In the example embodiment in FIG. 2, the patient accessory 160 comprises a blanket 160 that covers the body of a patient 180. However, this is by way of example only and should not be construed to limit the scope of the disclosure or the claims below. In alternate embodiments, the patient accessory 160 may comprise a pad 160 on which the patient 180 lies or a garment 160 that the patient 180 wears or a heat exchanger. For the sake of clarity and conciseness, the following descriptions shall assume that the patient accessory 160 comprises a thermal blanket 160.

The thermal accessory controller 110 uses an antimicrobial liquid to prevent microbes (e.g., bacteria) from growing and proliferating in the liquid path of the thermal accessory controller 110. In an example embodiment of the present disclosure, the thermal liquid comprises a glycol and water solution. As described below, the cleaning and disinfection procedure for the thermal accessory controller 110 implements a high-temperature disinfection technique in which the antimicrobial liquid may be brought to a temperature of, for example, 70° C. for a specified amount of time.

Figure 3:
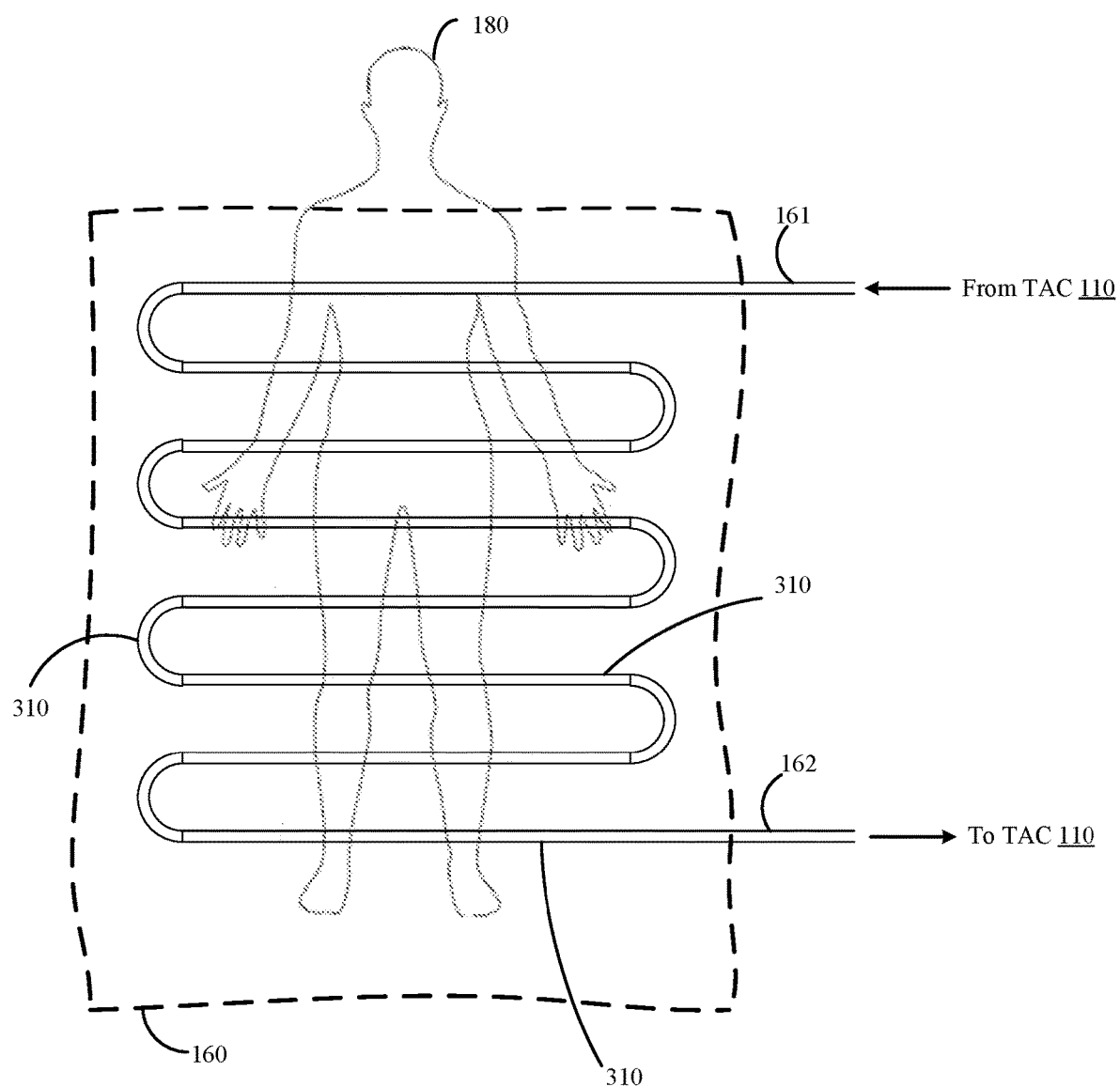
FIG. 3 illustrates in greater detail the thermal blanket of FIG. 2 according to one embodiment of the disclosure.

FIG. 3 illustrates in greater detail the thermal blanket 160 of FIG. 2 according to one embodiment of the present disclosure. In FIG. 3, the thermal blanket 160 comprises a flexible hose 310 that circulates the thermal liquid throughout the interior volume of the thermal blanket 160. The first end of the flexible hose 310 couples to the input conduit 161 and receives the incoming thermal liquid from the thermal accessory controller (TAC) 110. The second end of the flexible hose 310 couples to the output conduit 162 and transmits the outgoing thermal liquid back to the thermal accessory controller (TAC) 110.

The use of flexible hose 310 is merely an example of a system for circulating the heating/cooling thermal liquid throughout the thermal blanket 160. In an alternate embodiment, the interior of the thermal blanket 160 may comprise a series of small, connected cavities or chambers that form a honeycomb-like pattern or other diverting and converging pattern. In such an embodiment, an inlet port of the thermal blanket 160 couples to the input conduit 161 to receive incoming thermal liquid. At the other end of the thermal blanket 160, an outlet port couples to the output conduit 162.

Figure 4:
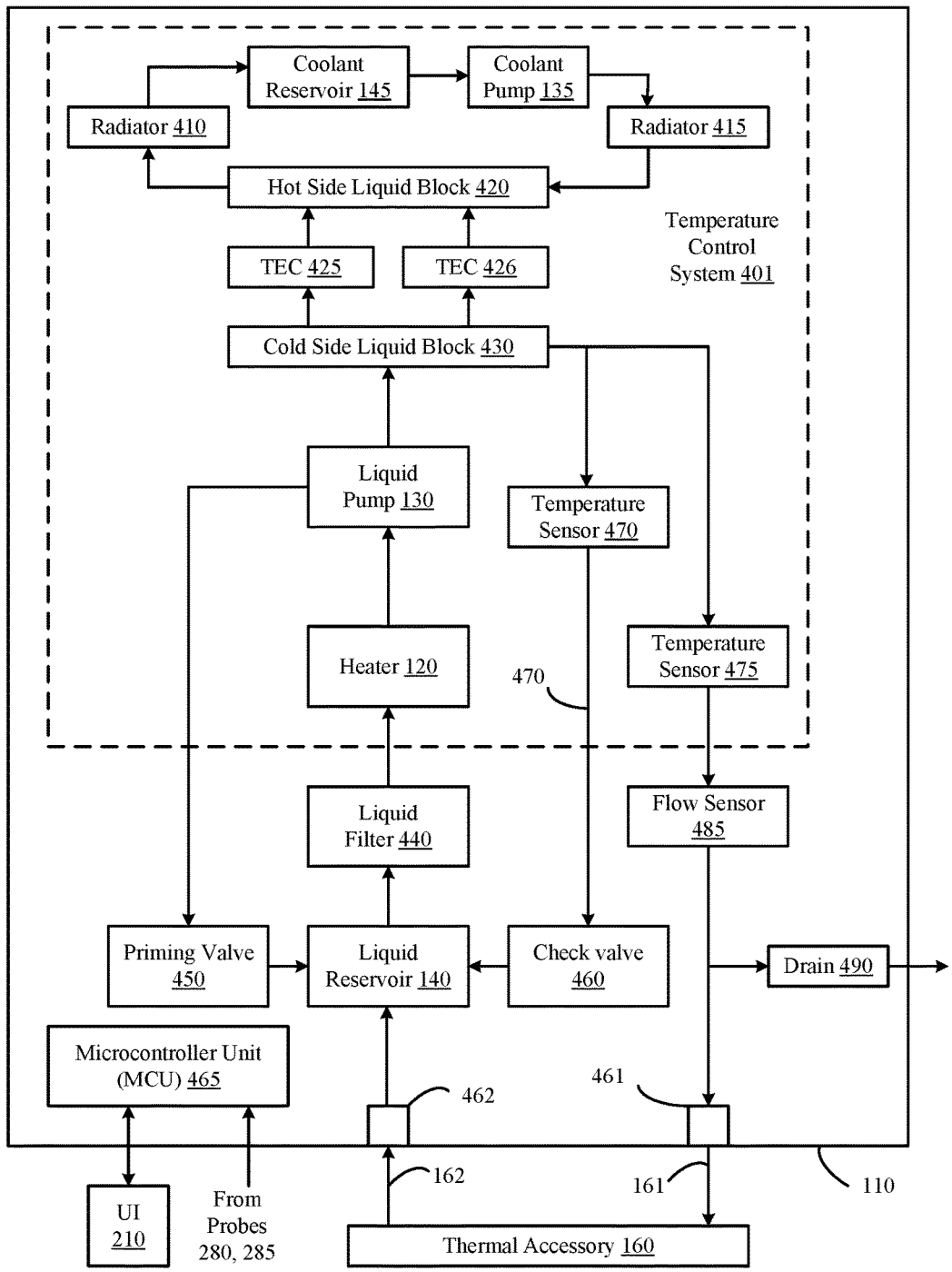
FIG. 4 is a flow diagram illustrating in greater detail the thermal accessory controller of FIG. 2 according to one embodiment of the disclosure.

FIG. 4 illustrates in greater detail the thermal accessory controller 110 of FIG. 1 according to one embodiment of the disclosure. The thermal accessory controller 110 comprises a temperature control system (TCS) 401, shown in a dotted outline. The temperature control system 401 comprises a heater 120, a liquid pump 130, one or more sensors 470 and 475, a cold side liquid block 430, one or more thermoelectric coolers (TECs), including TEC 425 and TEC 426, a hot side liquid block 420, one or more radiators, including radiator 410 and radiator 415, a coolant pump 135, and a coolant reservoir 145.

The thermal accessory controller 110 further comprises a microcontroller unit (MCU) 465, a priming valve 450, a liquid filter 440, one or more sensors 485, a liquid reservoir 140, a check valve 460, a drain 490, an output port 461 from the thermal accessory controller 110 that couples to an input conduit 161 from the thermal accessory 160, and an input port 462 from the thermal accessory controller 110 that couples to an output conduit 162 from the thermal accessory 160. The check valve 460 represents one or more check valves throughout the liquid path that prevent the thermal liquid from flowing backward, regulate the pressure in an output port such as output port 461, or a combination thereof.

The microcontroller unit (MCU) 465 controls the overall operation of the thermal accessory controller 110. In one embodiment, while in heating mode, the MCU 465 causes the liquid pump 130 to pump the temperature-controlled thermal liquid from the liquid reservoir 140 through a liquid filter 440, through the heater 120, and into the liquid pump 130. The liquid pump 130 then pumps the heated thermal liquid into the cold side liquid block 430, through one or more sensors 475 and 485, and then flows out of the thermal accessory controller 110 via the output port 461 and input conduit 161 of the thermal accessory 160. The returning thermal liquid re-enters the thermal accessory controller 110 via the output conduit 162 of the thermal accessory 160 and the input port 462, and then flows back into the liquid reservoir 140. The cycle is then repeated. In heating mode, the heater 120 is active. The TEC 425 and TEC 426 are inactive, as are the hot side liquid block 420, the radiators 410 and 415, the coolant pump 135, and the coolant reservoir 145.

In cooling mode, the MCU 465 deactivates the heater 120, but operates liquid pump 130 so that the returning thermal liquid again re-enters the thermal accessory controller 110 via the input port 462 and flows back into the liquid reservoir 140 and through the liquid filter 440. The liquid pump 130 continues to circulate the thermal liquid through the cold side liquid block 430 while the TEC 425 and TEC 426 are turned ON and operating. The cold side liquid block 430 includes an internal channel for the circulating thermal liquid, thereby allowing heat to transfer from the circulating thermal liquid to the bulk metal of liquid block 430. The TEC 425 and TEC 426 cool the cold side liquid block 430 by transferring heat from the bulk metal of the cold side liquid block 430 to the bulk metal of the hot side liquid block 420 by means of the Peltier effect. In the Peltier effect, an electrical voltage is applied across an electronic part to move heat from one side of the TEC to the other side, thereby creating separate cold and hot surfaces.

The cold surfaces of the TEC 425 and TEC 426 are in contact with the bulk metal of the cold side liquid block 430 and thus absorb thermal energy from the cold side liquid block 430. This low temperature of the bulk metal and thus the low temperature of the internal channel for the circulating thermal liquid cools the circulating thermal liquid before it exits the cold side liquid block 430 and then the output port 461. The hot surfaces of the TEC 425 and TEC 426 are in contact with the bulk metal of the hot side liquid block 420. Excess waste heat and heat from the circulating thermal liquid are transferred from the TEC 425 and TEC 426 to the bulk metal of the hot side liquid block 420. The hot side liquid block 420 includes an internal channel for a coolant liquid pumped by coolant pump 135 through radiator 415, radiator 410, and the coolant reservoir 145. The circulating coolant liquid transfers heat from the hot side liquid block 420 to be dissipated into the surrounding environment through radiators 410 and 415.

Under control of the user interface 210, the MCU 465 executes a set of user functions that include a run function, a test function, a prime function, a clean function, a settings function, and a maintenance function. The run function sets, controls, and monitors both the patient 180 and the internal liquid temperature of the thermal accessory controller 110. There are three main modes within the run function: i) a manual mode, ii) a probe mode, and iii) a smart mode.

The manual mode allows an operator to control the thermal liquid temperature that is output to the thermal blanket 160.

The probe mode allows an operator to monitor patient temperature probes 280 and 285 as well as set the desired patient temperature. An operator can see the liquid temperature of the internal circuit of the thermal accessory controller 110 while having control of the patient temperature directly.

The smart mode uses the same approach as the probe mode with the added feature of allowing an operator to select the maximum temperature differential between the patient and the thermal liquid in the thermal accessory 160.

The test function of the thermal accessory controller 110 allows an operator to run an internal check on the functionality of the internal components of the thermal accessory controller 110 and provides visual feedback on their status (pass/fail). For a pump to work properly, the liquid path of the pump must be fully flooded and free of any air in the system. The prime function ensures the internal liquid path of the thermal accessory controller 110 is flooded with thermal transfer liquid and that air is taken out of the system, in a particular embodiment, through priming valve 450.

The clean function of the thermal accessory controller 110 directs an operator through a cleaning and disinfection process of the thermal accessory controller 110 and allows the thermal accessory controller 110 to perform the necessary internal cycles for a successful cleaning and disinfection. The settings function of the thermal accessory controller 110 allows an operator to view and customize various features of the thermal accessory controller 110, such as screen brightness, screen sound, language, device name, and enabling or disabling a low energy consumption mode.

The maintenance function of the thermal accessory controller 110 allows an operator to see pertinent contact information for when it is necessary to service the thermal accessory controller 110. Additionally, maintenance mode provides an operator with system information regarding the software version, the user interface version, and the number of hours the thermal accessory controller 110 has been in operation. The maintenance function also provides an operator with a password-protected technician portal in which the operator may access more in-depth information about the past operation of the device, such as error logs, cleaning and disinfection treatments performed on the device, and the like.

In an example embodiment, the thermal accessory controller 110 controls liquid temperature by regulating the power to heater 120, which may be, for example, a 1200-watt stainless steel heater chamber. The temperature of the liquid is set by the operator through the screen of user interface (UI) 210. Once the liquid temperature is set, the system regulates the power to the heater 120 to control the liquid temperature. The power to the heater 120 is regulated through a closed-loop feedback system which receives input data from the two temperature probes 280 and 285 and internal temperature probes in sensors 470 and 475.

Figure 5:
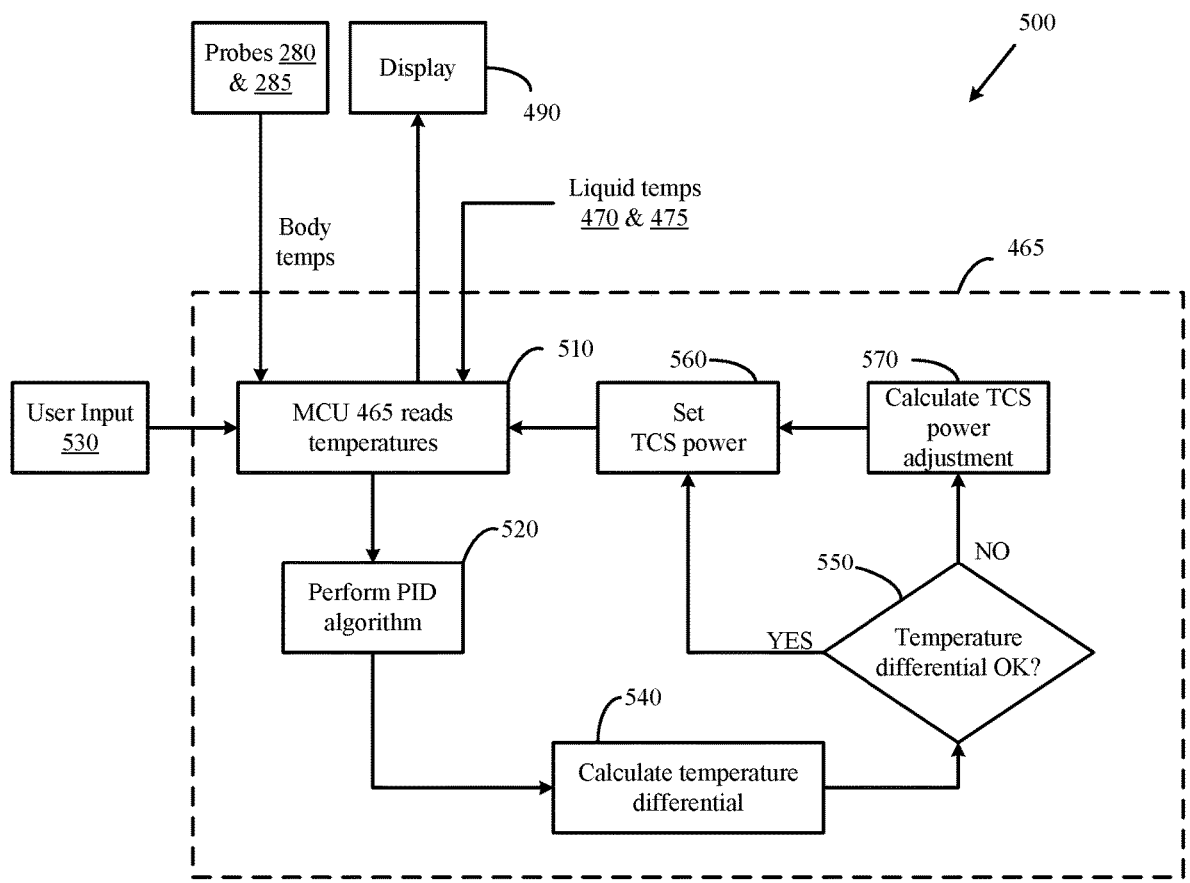
FIG. 5 is a flow diagram illustrating the operation of the microcontroller unit (MCU) according to one embodiment of the disclosure.

FIG. 5 is a flow diagram 500 illustrating the operation of the microcontroller unit (MCU) 465 according to one embodiment of the disclosure. In 510, the MCU 465 reads body temperature data from the patient temperature probes 280 and 285, liquid temperature data from sensors 470 and 475, and/or a user input 530. In 520, MCU 465 acts as a proportional-integral-derivative (PID) controller and performs a PID control algorithm. A PID controller continuously calculates an error value as the difference between a target setpoint and a measured process variable (PV) (i.e., the input from 510) and applies a correction based on PID terms. The PID algorithm automatically applies an accurate and responsive correction with minimal delay and overshoot.

In 540, the MCU 465 calculates the magnitude of a temperature differential between the target temperature and the measured body temperature. In 550, the MCU 465 determines if the magnitude of the temperature difference is less than a threshold value representing the safe allowable temperature differential between the circulating thermal liquid temperature and the body temperature (i.e., a first threshold value which could be set by MCU 465 or set by the operator in smart mode). If Yes in 550, the MCU 465 in 560 maintains the power the temperature control system (TCS) 401 provides to the heater 120 and to one or more TECs 425 and 426 and returns to 510. If the magnitude of the temperature difference exceeds the threshold value (No in 550), the MCU in 570 calculates an adjustment that the TCS 401 makes to the power applied to the heater 120 and to one or more TECs 425 and 426. The MCU 465 then sets the TCS power to the new level in 560 and returns to 510.

Figure 6:
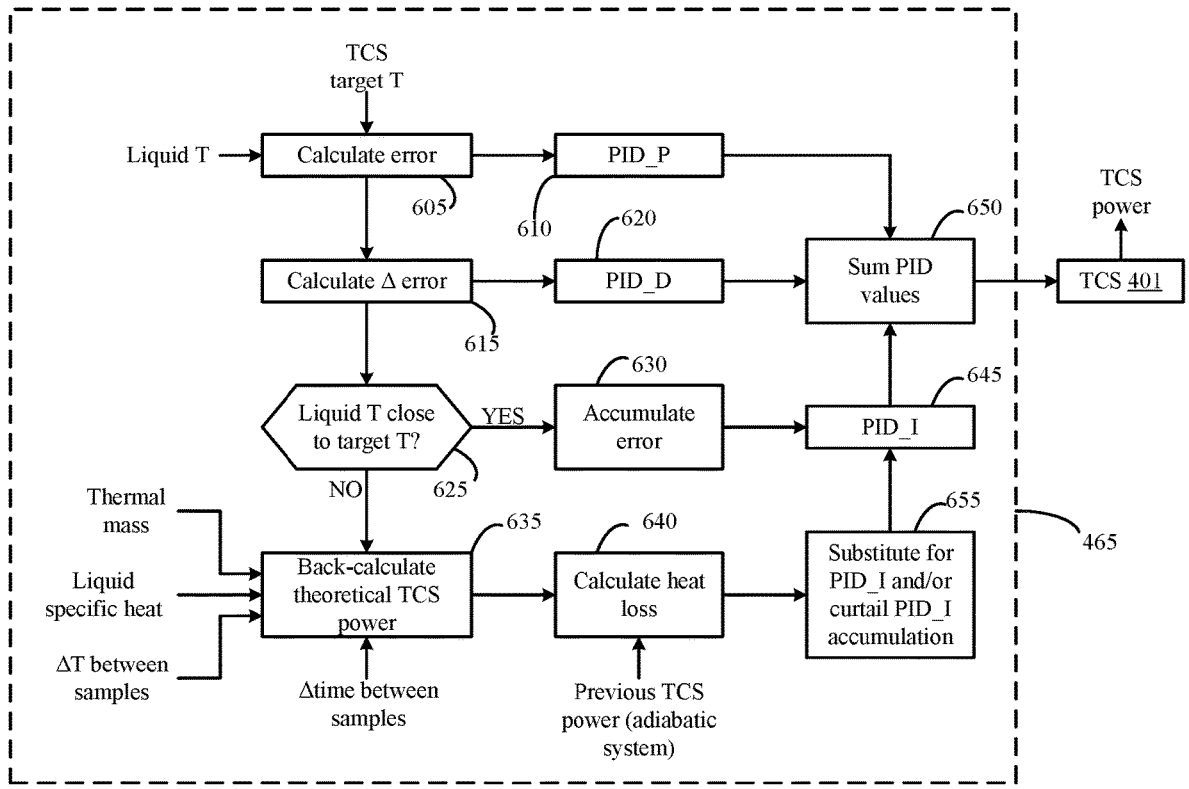
FIG. 6 is a flow diagram illustrating the operation of the proportional-integral-derivative (PID) algorithm and other algorithms performed by the microcontroller unit (MCU) in the thermal blanket controller according to one embodiment of the disclosure.

FIG. 6 is a flow diagram 600 illustrating the operation of the proportional-integral-differential (PID) algorithm performed by the microcontroller unit (MCU) 465 in the thermal accessory controller 110 according to one embodiment of the disclosure. The MCU 465 executes a PID algorithm that employs a novel technique that compares the thermal losses in the patient thermal regulation system 200 to an adiabatic system (i.e., a system in which no heat transfer occurs) to balance more accurately a variety of thermal loads.

In the disclosed PID algorithm, the MCU 465 calculates the proportional component (PID_P) and the derivative component (PID_D) as normal. However, the MCU 465 calculates the integral component (PID_I) differently, depending on the magnitude of the difference between the TCS target temperature, TCS(T), and the current temperature of the thermal liquid, Liquid(T). When the target temperature is very close to the current temperature, the MCU 465 calculates the PID_I component as expected (i.e., by continually adding the error to an accumulating variable). When the target temperature is not close to the current temperature, the MCU 465 modifies the PID_I component by substitution with a value representative of the heat dissipated by the patient thermal regulation system 200, by curtailing the magnitude (i.e., absolute value) of the maximum allowable accumulating PID_I variable with a value representative of the heat dissipated by the patient thermal regulation system 200, or a combination thereof.

The MCU 465 determines the replacement value by comparing the actual heat energy added to the temperature control system (TCS) 401 to the heat energy added to an adiabatic system. The energy added in an adiabatic system (i.e., no thermal losses) is simply the set value of power for the TCS 401. Using a previously stored temperature value at a known point in time, the thermal energy added to the TCS 401 is back calculated using standard thermodynamic equations. The difference between these two values is a good estimate for the heat lost by the TCS 401. The accumulating variable PID_I is then set to the replacement value or curtailed by the replacement value. The unique method of processing the PID_I component provides a novel control mechanism that back calculates the thermal energy lost in the TCS 401 system to obtain an estimated balancing point before the system temperature reaches a target temperature.

The disclosed PID algorithm prevents the overshooting, undershooting, and oscillation that would normally occur in a traditional PID control system, since under normal circumstances, the PID_I component would be accumulating to arbitrarily large positive or negative values while the TCS 401 is adjusting the temperature of the system thermal liquid. Due to the slow response time of a TCS 401 when heating or cooling a large volume of thermal liquid, the PID algorithm is necessary to obtain accurate temperature balancing at a variety of thermal loads and losses.

In FIG. 6, the MCU 465 calculates in 605 an error value (or difference) between the target temperature, TCS(T), and the current thermal liquid temperature, Liquid(T). The TCS(T)-Liquid(T) error value is the input of the proportional PID_P calculation controller 610. Thus, the output of PID_P calculation controller 610 is proportional to the current value of the TCS(T)-Liquid(T) error value. For example, if the error value is large and positive, the control output of PID_P calculation controller 610 is proportionately large and positive according to a gain factor "K".

In 615, the MCU 465 calculates the rate of change (or Δ) in the error value. The Δ error is the input of the PID_D calculation controller 620. The output of the PID_D calculation controller 620 comprises a best estimate of the future trend of the TCS(T)-Liquid(T) error value, based on its current rate of change. The more rapid the change, the greater the controlling or damping effect by the PID_D calculation controller 620.

In 625, the MCU 465 determines if the thermal liquid temperature Liquid(T) is close to the target temperature TCS(T) by comparing the difference between the thermal liquid temperature Liquid(T) and the target temperature TCS(T) to a second threshold value representing a shift from TCS function from a temperature adjustment mode to a temperature balancing mode. If Yes in 625, the MCU 465 in 630 calculates the PID_I component normally by accumulating the past values of the TCS(T)-Liquid(T) error value, which forms the input to the PID_I calculation controller 645. The PID_I calculation controller 645 accounts for the past values of the TCS(T)-Liquid(T) error value and integrates the past error values over time to produce the integral (I) term. For example, if there is a residual TCS(T)-Liquid(T) error value after the application of proportional (P) control, the integral (I) term seeks to eliminate the residual error by adding a control effect due to the historic cumulative value of the TCS(T)-Liquid(T) error value. When the error is eliminated, the integral term ceases to grow. This results in the proportional effect diminishing as the error decreases, but this is compensated for by the growing integral effect. Next, the MCU 465 in 650 sums the PID_P, PID_D, and PID_I components to produce an adjustment value for the power setting of the TCS 401.

If No in 625, the MCU 465 in 635 back calculates the theoretical TCS 401 power, based on the thermal mass, the specific heat of the liquid, the temperature difference (ΔT) between samples, and the time difference (Δt) between samples. In 640, the MCU 465 uses the theoretical TCS power value from 635 and a previous TCS 401 power level to calculate a heat loss value. This heat loss value is utilized in calculation 655 to modify or curtail the PID_I accumulation value, which is an input to the PID_I calculation controller 645. Then, the MCU 465 in 650 sums the PID_P, PID_D, and PID_I components to produce an adjustment value for the power setting of the TCS 401.

Figure 7:
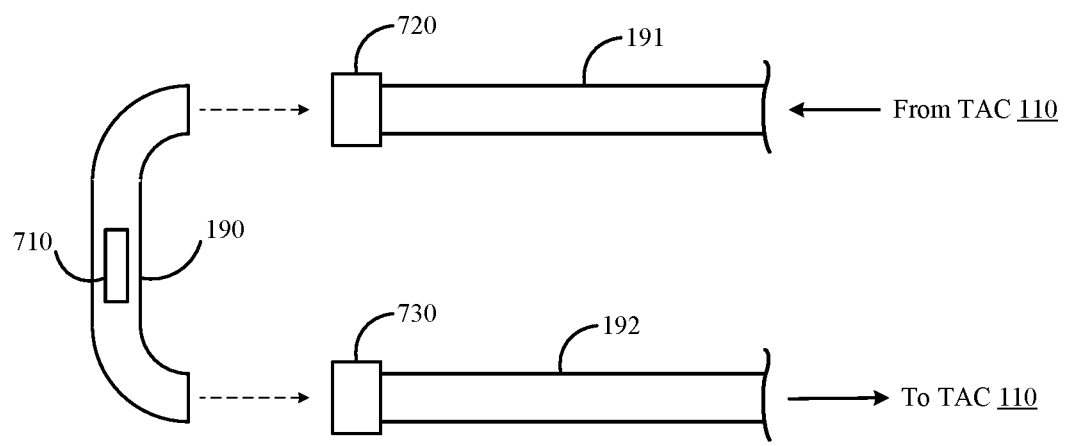
FIG. 7 illustrates a conduit used to decontaminate the thermal blanket controller according to one embodiment of the disclosure.

FIG. 7 illustrates the components of a loop back connector 190 used to decontaminate the thermal accessory controller 110 according to one embodiment of the disclosure. An operator couples a first end of the loop back connector 190 to a connector 720 at a distal end of the input conduit 191 and couples a second end of the loop back connector 190 to a connector 730 at a distal end of the output conduit 192. The loop back connector 190 provides a liquid path directly from the input conduit 191 to the output conduit 192 when the thermal blanket 160 is disconnected for cleaning operations.

The loop back connector 190 ensures that the thermal accessory controller 110 is not connected to a thermal blanket 160 and reduces the risk of misuse of the device. Once the loop back connector 190 is connected, the operator presses a button on the user interface 210, which starts the cleaning and disinfection procedure. The operator is then free to leave the thermal accessory controller 110 unattended and return when the procedure is finished. The MCU 465 automatically shuts off the cleaning and disinfection procedure after a set period.

In an embodiment, the loop back connector 190 includes a loop back probe 710 (or temperature sensor 710) that records the temperature of the liquid in the loop back connector 190 to ensure that it is heated sufficiently during a disinfection procedure to kill microbes in the liquid path and to ensure the thermal accessory controller 110 is not attached to a patient. The loop back probe 710 may be positioned in the mid-point of the loop back connector 190 to check the temperature at the most distant point in the liquid path. The loop back probe 710 may communicate with the thermal accessory controller 110 by a wireline (not shown) in the loop back connector 190 or wirelessly by, for example, a Bluetooth transceiver (not shown) in the housing of the loop back probe 710 itself.

Figure 8:
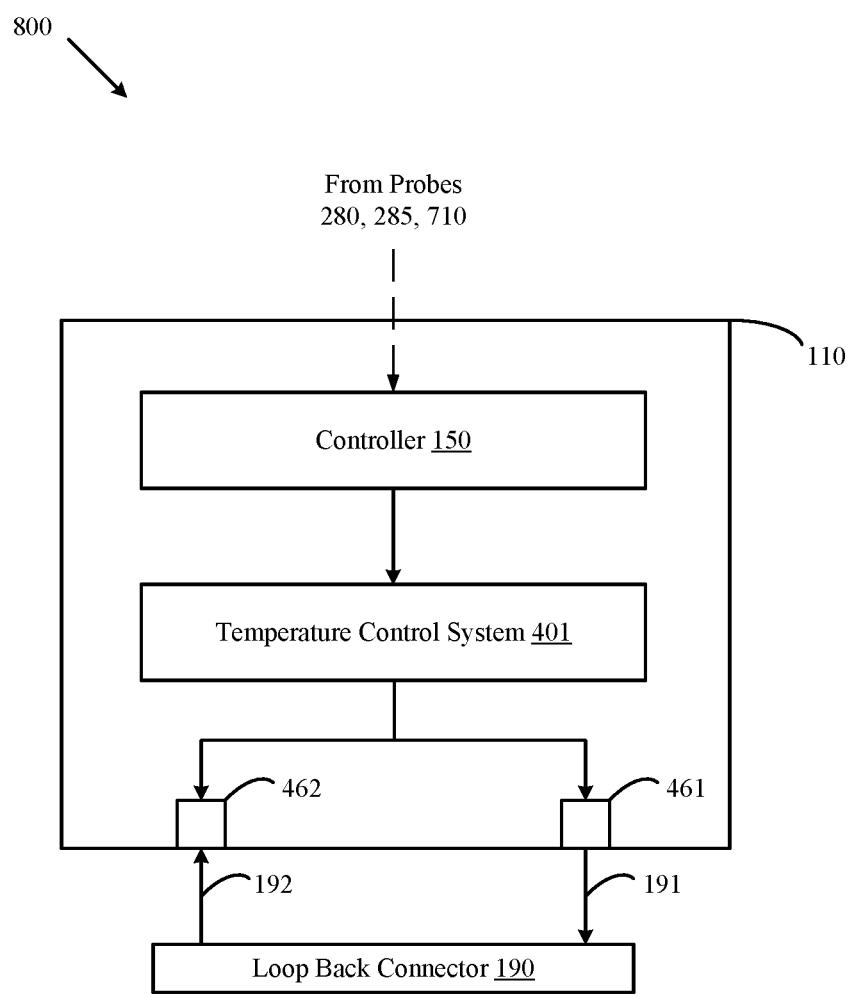
FIG. 8 is a flow diagram illustrating the operation of the decontamination procedure of the thermal accessory controller according to one embodiment of the disclosure.

FIG. 8 is a flow diagram 800 showing the operation of the decontamination procedure of the thermal accessory controller according to one embodiment of the disclosure. The components used in the decontamination procedure comprise the thermal accessory controller 110, which includes a main controller 150, the temperature control system 401, an input port 462, an output port 461, a loop back connector 190, an input liquid conduit to the loop back connector 191, and an output liquid conduit from the loop back connector 192. The circulating liquid used for normal operation, the decontamination procedure, or both normal operation and the decontamination procedure may include a residual disinfectant and/or an antimicrobial liquid.

The input to the main controller 150 within the thermal accessory controller 110 is temperature information from one or more probes (e.g., patient temperature probes 280 and 285 or a loop back probe 710). The main controller 150 measures the resistance of the probe(s) connected to the thermal accessory controller 110 and detects whether patient temperature probes 280 and 285 or a loop back probe 710 is connected through the use of temperature-resistance curves. The decontamination procedure using 70° C. liquid will only occur if the main controller 150 detects the use of a loop back probe 710.

To verify that the loop back connector 190 is attached to the thermal accessory controller 110, the temperature control system 401 ensures that the temperature of the liquid within the device matches the temperature of the loop back connector 190. The liquid flows from the temperature control system 401, through the output port 461 of the thermal accessory controller 110, the input liquid conduit 191, the loop back connector 190, the output liquid conduit 192, and back into the thermal accessory controller 110 through the input port 462. The liquid path touches all internal plumbing in the thermal accessory controller 110 to ensure each component is decontaminated.

Unique aspects of the disclosed system and method include the use of a glycol liquid to reduce antimicrobial load and a cleaning mode that uses 70° C. liquid to kill microbes in the thermal accessory controller 110. More specifically, the glycol liquid creates an unsuitable environment for microbial growth through mechanisms that include, but are not limited to, decreasing surface tension, chemical structure, osmotic effect, chemical additives, and alkalinity. The glycol liquid also increases the boiling point to achieve higher temperatures and without loss (via evaporation) of usable solution volume in liquid state flowing through the system. The glycol liquid decreases the freezing point to achieve colder temperatures and to prevent solidification of solution that may cause clogging at lower temperatures.

Furthermore, the coloration of the glycol liquid improves safety by clearly distinguishing the appropriate liquid to be used and by making it easier to detect leaks, inhibited flow, or bubbles.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A controller for a thermal accessory, the controller comprising:
 a conduit that provides a liquid path for a thermal liquid through the controller and that includes:
  an input through which the thermal liquid exits the controller;
  an output through which the thermal liquid returning from the thermal accessory enters the controller;
 a first liquid pump that is in liquid communication with the conduit and that is configured to move the thermal liquid through the conduit along the liquid path;
 a thermal liquid reservoir in liquid communication with the first liquid pump;
 a first liquid block in liquid communication with the first liquid pump, the first liquid block including an internal channel for transferring the thermal liquid;
 a second liquid block including an internal channel for transferring a coolant liquid;
 a heating component that is external to the thermal liquid reservoir, in liquid communication with the first liquid pump, and is configured to, when active, heat the thermal liquid as the thermal liquid moves through the conduit from the thermal liquid reservoir toward the first liquid pump;
 a cooling component in liquid communication with the second liquid block;
 a heat transfer component configured to transfer heat from the first liquid block to the second liquid block; and
 a control unit configured to manage a temperature of the thermal accessory by either (i) heating the thermal liquid through controlled activation of the heating component or (ii) cooling the thermal liquid through controlled activation of the heat transfer component, in such a manner that oscillation of the temperature about a target temperature is reduced.

2. The controller as set forth in claim 1, wherein the first liquid pump is configured to pump the thermal liquid from the thermal liquid reservoir through the heating component and the first liquid block.

3. The controller as set forth in claim 1, wherein the first liquid pump is configured to pump the thermal liquid from the first liquid block through the thermal accessory via the conduit.

4. The controller as set forth in claim 1, wherein the first liquid pump is configured to pump the thermal liquid from the thermal accessory through the thermal liquid reservoir via the conduit.

5. The controller as set forth in claim 1, wherein the first liquid pump, in a heating mode, is configured to pump the thermal liquid through the heating component while the heating component is active and through the first liquid block while the heat transfer component is inactive.

6. The controller as set forth in claim 1, wherein the first liquid pump, in a cooling mode, is configured to pump the thermal liquid through the heating component while the heating component is inactive and through the first liquid block while the heat transfer component is active.

7. The controller as set forth in claim 6, wherein the heat transfer component comprises at least one thermoelectric cooler configured to transfer heat from the first liquid block to the second liquid block while in the cooling mode.

8. The controller as set forth in claim 7, wherein the at least one thermoelectric cooler comprises a first surface in contact with the first liquid block and a second surface in contact with the second liquid block.

9. The controller as set forth in claim 1, wherein the thermal liquid comprises glycol.

10. The controller as set forth in claim 1, wherein the thermal liquid is in a range from 30% glycol and 70% water to 70% glycol and 30% water.

11. The controller as set forth in claim 1, further comprising:
 at least one radiator in liquid communication with the second liquid block; and
 a second liquid pump in liquid communication with the second liquid block and the at least one radiator.

12. The controller as set forth in claim 11, wherein the second liquid pump, in a cooling mode, is configured to pump the coolant liquid through the internal channel of the second liquid block through the at least one radiator.

13. The controller as set forth in claim 11, wherein the thermal liquid and the coolant liquid are water-based.

14. A method of operating a controller for a thermal accessory, the method comprising:
 pumping a thermal liquid from a liquid reservoir through a heating component and a first liquid block, the first liquid block including an internal channel for transferring the thermal liquid;
 pumping the thermal liquid from the first liquid block through the thermal accessory coupled to the controller;
 pumping the thermal liquid from the thermal accessory through the liquid reservoir;
 calculating, for the thermal accessory, a balancing point to reduce oscillation of an actual temperature of the thermal accessory about a target temperature;
 in response to a determination that the controller is in a heating mode, heating, based on the balancing point, the thermal liquid in the heating component, so as to increase the actual temperature of the thermal accessory; and
 in response to a determination that the controller is in a cooling mode, cooling, based on the balancing point, the thermal liquid by transferring heat from the first liquid block to a second liquid block, the second liquid block including an internal channel for transferring a coolant liquid.

15. The method of operating the controller as set forth in claim 14, wherein transferring heat in the cooling mode comprises transferring heat from the first liquid block to the second liquid block using at least one thermoelectric cooler.

16. The method of operating the controller as set forth in claim 15, wherein the at least one thermoelectric cooler comprises a first surface in contact with the first liquid block and a second surface in contact with the second liquid block.

17. The method of operating the controller as set forth in claim 14, wherein the thermal liquid comprises glycol.

18. The method of operating the controller as set forth in claim 17, wherein the thermal liquid is in a range from 30% glycol and 70% water to 70% glycol and 30% water.

19. The method of operating the controller as set forth in claim 14, wherein the thermal liquid and the coolant liquid are water-based.

20. A controller for a thermal accessory, the controller comprising:
- an output conduit through which a thermal liquid destined for the thermal accessory is able to exit the controller;
- an input conduit at which the thermal liquid returning from the thermal accessory is able to enter the controller;
- a first reservoir that includes a store of the thermal liquid; and
- a temperature control system that includes-
    - a second reservoir that includes a store of coolant;
    - a pair of liquid blocks, the pair of liquid blocks including (i) a first liquid block that includes a first channel defined therethrough and (ii) a second liquid block that includes a second channel defined therethrough;
    - a heating component;
    - a first pump that is in liquid communication with the input conduit and that, in operation, is configured to move the thermal liquid through the heating component to warm the thermal liquid and then through first channel in the first liquid block;
    - a second pump that is in liquid communication with the second reservoir and that, in operation, is configured to move the coolant through the second channel in the second liquid block;
    - a heat transfer component that, in operation, is configured to transfer heat from the first liquid block to the second liquid block; and
    - a control unit configured to manage a temperature of the thermal accessory by either (i) heating the thermal liquid through controlled activation of the heating component or (ii) cooling the thermal liquid through controlled activation of the heat transfer component, in such a manner that oscillation of the temperature about a target temperature is reduced.

* * * * *